United States Patent

Yamada et al.

[15] 3,671,649
[45] June 20, 1972

[54] PRODUCTION OF A HETEROCYCLIC COMPOUND HAVING AN IMIDAZOLE RING

[72] Inventors: Yoshitaka Yamada; Moritaro Sakurai; Izumi Kumashiro, all of Kanagawa-ken, Japan

[73] Assignee: Ajinomoto Co., Inc., Tokyo, Japan

[22] Filed: April 11, 1969

[21] Appl. No.: 816,061

[30] Foreign Application Priority Data
Apr. 15, 1968 Japan.............................43/24764

[52] U.S. Cl.............................260/252, 260/309.6
[51] Int. Cl....................................C07d 57/64, C07d 49/34
[58] Field of Search.........................260/252, 309

[56] References Cited

UNITED STATES PATENTS 3,427,315  2/1969  Nomwa et al..........................260/252

Primary Examiner—Alex Mazel
Assistant Examiner—Anne Marie T. Tighe
Attorney—Kurt Kelman

[57] ABSTRACT

Adenine (AD) and/or 4,5-dicyanoimidazole (DCI) and derivatives thereof (2,8-methyl-AD and/or 2-methyl-DCI) are produced by the reaction of diaminomaleonitrile or diaminofumalonitrile with an amidine salt in an organic medium.

AD and DCI have been industrially produced by heating liquid hydrogen cyanide (or ammonium cyanide or a mixture of alkali cyanide and ammonium halide) in liquid ammonia (Japanese Pat. No. 483,920; U.S. Pat. No. 3,287,452). However, this known method is not satisfactory, because the dangerous treatment of poisonous hydrogen cyanide or its salt under a high pressure is necessary and the insoluble colored byproducts, which make the separation and purification of the desired product difficult, are formed in a substantial amount. Further, according to the known method, AD and DCI are usually produced in nearly the same amount and the selective production of one of the compounds is difficult.

8 Claims, No Drawings

PRODUCTION OF A HETEROCYCLIC COMPOUND HAVING AN IMIDAZOLE RING

This invention is a process for producing the heterocyclic compound having the formula:

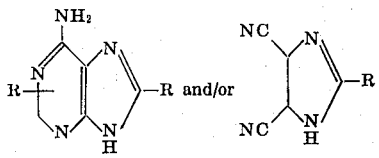

(wherein R is hydrogen or methyl group) which comprises reacting diaminomaleonitrile (DAMN) or diaminofumaronitrile (DAFN) with an amidine salt having the formula:

$[H_2N=C(R)NH_2]^+X^-$ (wherein R is as above and X is an organic or inorganic acid radical) with heating in an organic medium selected from the group consisting of an aliphatic lower alkyl alcohol having one to four carbon atoms, formamide, dimethylformamide, dimethylacetamide, dimethylaniline, anisole, dioxane and pyridine.

The starting compounds DAMN and DAFN can be used independently or together as an optional ratio mixture. The reaction is not affected by the species of the starting compound. DAMN can be easily obtained in nearly quantitative yield by the polymerization of hydrogen cyanide in the presence of alumina (U.S. Pat. No. 2,499,441). DAFN is the stereoisomer of DAMN and is formed in high yield by esposing DAMN to ultraviolet light of 300–320 mμ in an organic medium, such as an aliphatic lower alkyl alcohol, dioxane, dimethylacetamide and acetonitrile.

The representative acid which provides acid radical composing the amidine salt, is a mineral acid such as hydrochloric acid, sulfuric acid and phosphoric acid; a carboxylic acid such as formic acid, acetic acid, propionic acid, oxalic acid and succinic acid; and an organic sulfonic acid such as benzene sulfonic acid and toluene sulfonic acid. The amidine salt is employed in 1.5–8.0 moles per one mole of DAMN and DAFN employed.

The reaction proceeds when the mixture of DAMN or DAFN, the amidine salt and the organic medium is heated to 80–200°BHC, particularly 120°–150° C.

The organic medium is usually employed in 0.1–20 l. particularly 0.5–5 l. per one mole of DAMN and DAFN. Generally, the increase of the concentration of DAMN and DAFN tends to increase selective yield of AD, whereas the decrease of the concentration tends to increase that of DCI.

The selective yield of AD or DCI is most affected by the species of the medium. In general, methanol, ethanol, formamide, dimethylaniline and dioxane give AD predominantly. On the other hand, dimethylformamide, dimethylacetamide and n-butanol give usually DCI superior to AD.

The yields of the desirable products, particularly of AD, can be increased by the addition of ammonium salt of a lower aliphatic carboxylic acid, such as ammonium formate, ammonium acetate and ammonium propionate. The usual addition amount of the ammonium salt is 0.5–20 (wt./vol.)% to the reaction mixture consisting of DAMN and/or DAFN, an amidine salt and a medium. The presence of water or ammonia which promote the usual polymerization reaction of DAMN or DAFN decreases the yield of the products. It is, therefore, recommended to remove water or ammonia from the raw materials when it is present. For instance, when formamide is used as the medium, the addition of a small amount (about 0.5 percent) of a lower aliphatic carboxylic acid gives good results, because formamide usually contains a small amount of ammonia.

After the reaction, the medium is removed by distillation and the product, AD or DCI is easily separated from the residue by the known extraction methods such as those disclosed in U.S. Pat. No. 3,287,452 and Japanese Pat. No. 499,690.

According to the present invention, the formation of the complex by-products derived from hydrogen cyanide, which is unavoidable in the known method, is avoided; the high yield of AD and/or DCI is achieved, and the separation of the product is easy. Although DAMN and DAFN are synthesized from hydrogen cyanide, the synthesis is carried out easily at an ordinary pressure, the dangerousness is lesser by far than the known AD and DCI production method wherein hydrogen cyanide is handled at a high pressure. Further, AD and DCI can be produced in an optional, desirable ratio, the rational production is, therefore, exercised by the suitable election of the reaction conditions according to the ratio of commercial demands of both compounds.

The following examples illustrate the present procedure. The yield in each example is the theoretical one to DAMN or DAFN employed.

When any of the examples lacks the description of the quantitative analytical methods of AD and DCI, they are carried out as follows:

The organic medium is removed by the distillation, the residue is then treated with 3 normal ammonia water to extract the products, and the extract is developed on the filter paper by the paper chromatographical method using a mixed solvent of n-propanol : 28 percent ammonia water : water (20:15:3 by vol.). Then, AD and DCI is extracted from its spot, respectively, and the absorbances are determined at 263–320 μ in the case of AD and at 247–320 in the case of DCI. Based on thus determined absorbances, the yields of AD and DCI are calculated.

EXAMPLE 1

A mixture of 540 mg (5 millimoles) DAMN, 1,040 mg (10 millimoles) formamidine acetate and 25 ml medium listed in Table 1 was heated to 130° C. for 5 hours in a sealed tube. The reaction mixture was then dissolved in 3 normal ammonia water and the yields of AD and DCI were determined by the method afore-mentioned.

The results are sumarized in Table 1

TABLE 1

| Medium | Yield of AD (%) | Yield of DCI (%) |
|---|---|---|
| Anisole | 32 | 2 |
| Pyridine | 2 | 49 |
| Dimethylformamide | 6 | 48 |
| Dimethylacetamide | 9 | 45 |
| Formamide | 30 | 21 |
| Dioxane | 30 | 13 |
| Ethanol | 26 | 9 |
| n-Butanol | 15 | 25 |

EXAMPLE 2.

The process of Example 1 was repeated using DAFN in place DAMN. The results are shown in Table 2.

TABLE 2

| Medium | Yield of AD (%) | Yield of DCI (%) |
|---|---|---|
| Pyridine | 3 | 52 |
| Formamide | 27 | 20 |
| Dioxane | 33 | 18 |
| Ethanol | 29 | 10 |

EXAMPLE 3.

A mixture of 1.08 g (10 millimoles) DAMN, Y g (20 millimoles) formamidine salt listed in Table 2 and 10 ml methanol was heated to 125° C. for 2 hours in a sealed tube. The reaction mixture was then dissolved in 100 ml 6 normal ammonia water and the content of AD in the solution was analyzed to obtain the results shown in Table 3.

TABLE 3

| Formamidine- | Yg | Yield of AD (%) |
|---|---|---|
| hydrochloride | 1.6 | 38 |
| sulfate | 2.8 | 36 |
| formate | 2.2 | 42 |
| acetate | 2.1 | 43 |
| p-toluenesulfonate | 5.0 | 34 |

EXAMPLE 4.

A mixture of 540 mg (5 millimoles)DAMN, 1040 mg (10 millimoles) formamidine acetate and 25 ml dimethyl aniline was heated to 130° C. for 2 hours in a sealed tube. By the quantitative analysis of AD and DCI in the reaction mixture results in AD yield 42 percent and DCI yield lower than 2 percent.

When the reaction temperature was 110° C and 150° C, the AD yield was 31 percent and 36 percent respectively.

EXAMPLE 5.

A mixture of 540 mg (5 millimoles)DAMN, 1,040 mg (10 millimoles)formamidine acetate, 1.25 g one of the additives listed in Table 3, and 25 ml formamide was heated to 130° C. for 2 hours. The yield of AD corresponding to each additive was found as shown in Table 4.

TABLE 4

| Additive | Yield of AD (%) |
|---|---|
| Ammonium Formate | 49 |
| Ammonium acetate | 50 |
| Ammonium propionate | 42 |

EXAMPLE 6.

To 40 ml anhydrous methanol containing 2 g ammonium acetate, 5.4 g (50 millimoles)DAMN and 10.4 g (100 millimoles)formamidine acetate were added and the mixture was kept at 130° C. for 2 hours in an autoclave. After the reaction, methanol was removed by the distillation to obtain black residue. (By the quantitative analysis the yields of AD and DCI were confirmed as 55 percent and 6 percent respectively.) The residue was extracted with three 200 ml batches of 3 normal ammonia water. The combined extracts were concentrated to remove ammonia and acidified with hydrochloric acid, and then decolored with activated carbon. The solution was neutralized with 6 normal aqueous sodium hydroxide solution and cooled with ice water to obtain 3.20 g (Yield 47 percent nearly pure crystals of AD.

The UV and IR absorption spectra of the crystals were completely identical with those of the authentic samples.

| Elementary Analysis | C | H | N(%) |
|---|---|---|---|
| Found | 44.65 | 3.52 | 52.00 |
| Calcd. for $C_5H_5N_5$ | 44.44 | 3.73 | 51.83 |

The mother liquor was then acidified to pH$^2$ with hydrochloric acid and extracted with two 25 ml batches of ethyl acetate. The extracts were combined and ethyl acetate was removed from the combined extract by the distillation to obtain 0.336 g (Yield 5.7 percent of crude crystals of DCI. The crystals purified by the recrystallization from hot water melted at 175° C.

EXAMPLE 8.

A mixture of 100 ml distilled formamide, 0.5 ml formic acid, 5 g ammonium formate, 10.4 g (100 millimoles) formamidine acetate and 5.4 g (50 millimoles)DAMN was kept at 130° C. for 2 hours in an egg plant type flask having 300 ml capacity. After the reaction, formamidine was removed by the vacuum distillation. By the quantitative analysis, the yields of AD and DCI were confirmed as 51 percent and 7 percent, respectively. On treating the residue in the manner described in Example 6, 3.1 g (Yield 46 percent) crystals of AD were obtained.

EXAMPLE 8.

A mixture of 10.8 g (100 millimoles)DAMN, 19.0 g acetoamidine acetate and 500 ml dimethyl aniline was heated to 130° C. for 2 hours. After the reaction, dimethyl aniline was removed by the vacuum distillation and the residue was dissolved in one liter 3 normal ammonia water, and filtered. The filtrate was concentrated to dryness by the vacuum distillation. The residue was dissolved in a small amount of water and contacted with 1000 ml hydrogen type ion exchange resin Dowex 50 (Trade mark: 100–200 mesh). The resin was washed with water and the product absorbed on the resin was eluted with 2 normal hydrochloric acid. The eluate was concentrated by the vacuum distillation and neutralized with an aqueous sodium hydroxide solution to obtain 2.2 g (Yield 27 percent) nearly pure crystals of 2,8-dimethyl-AD. The melting point of the crystal is above 300° C.

| Elementary Analysis | C | H | N(%) |
|---|---|---|---|
| Found | 51.30 | 5.72 | 42.75 |
| Calcd. for $C_7H_9N_5$ | 51.52 | 5.56 | 42.92 |

We claim:

1. A method of preparing a compound of the group consisting of adenine and of 4,5-dicyanoimidazole which comprises reacting a dinitrile of diaminomaleic acid or diaminofumaric acid with formadine or acetamidine at elevated temperature in the presence of a solvent selected from the group consisting of alkanols having one to four carbon atoms, formamide, dimethylformamide, dimethylacetamide, dimethylaniline, anisole, dioxane and pyridine until said compound is formed.

2. A method as set forth in claim 1, wherein said formamidine or acetamidine is reacted in the form of a salt thereof with said dinitrile.

3. A method as set forth in claim 2, which further comprises recovering said compound.

4. A method as set forth in claim 2, wherein said salt is reacted with said dinitrile in an amount of 1.5 to 8.0 moles per mole of said dinitrile.

5. A method as set forth in claim 4, wherein said elevated temperature is between 80° and 200° C.

6. A method as set forth in claim 5, wherein the amount of said solvent is 0.5 to 5 liters per mole of said dinitrile.

7. A method as set forth in claim 2, wherein said salt is reacted with said dinitrile in the presence of an ammonium salt of a lower alkanoic acid, said ammonium salt being present in the reaction mixture in an amount of 0.5 to 20 grams per 100 ml.

8. A method as set forth in claim 1, wherein said solvent is substantially free of water and ammonia.

* * * * *